US011409475B2

(12) United States Patent
Ayukawa

(10) Patent No.: US 11,409,475 B2
(45) Date of Patent: Aug. 9, 2022

(54) INSPECTION APPARATUS, IMAGE FORMING SYSTEM, INSPECTION PROGRAM, AND INSPECTION METHOD

(71) Applicant: KONICA MINOLTA, INC., Tokyo (JP)

(72) Inventor: Shoichi Ayukawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 233 days.

(21) Appl. No.: 16/742,516

(22) Filed: Jan. 14, 2020

(65) Prior Publication Data

US 2020/0233618 A1 Jul. 23, 2020

(30) Foreign Application Priority Data

Jan. 18, 2019 (JP) .............................. JP2019-007218

(51) Int. Cl.
| | | |
|---|---|---|
| *G06T 7/00* | (2017.01) | |
| *H04N 1/00* | (2006.01) | |
| *G06F 3/12* | (2006.01) | |

(52) U.S. Cl.
CPC ............ *G06F 3/1208* (2013.01); *G06T 7/001* (2013.01); *H04N 1/00015* (2013.01); *G06T 2207/10008* (2013.01); *G06T 2207/30144* (2013.01)

(58) Field of Classification Search
USPC .............. 358/1.1–3.29, 1.11–1.18, 501–504; 382/190–221, 306; 399/8–31, 72, 389
See application file for complete search history.

(56) References Cited

U.S. PATENT DOCUMENTS

| | | | |
|---|---|---|---|
| 5,712,921 | A | 1/1998 | Zabele |
| 9,007,658 | B2 * | 4/2015 | Ito ........................... G06T 7/001 358/2.1 |

(Continued)

FOREIGN PATENT DOCUMENTS

| | | |
|---|---|---|
| JP | 2003136818 A | 5/2003 |
| JP | 2005250327 A | 9/2005 |

(Continued)

OTHER PUBLICATIONS

Japanese Office Action (and English language translation thereof) dated Aug. 10, 2021 issued in Japanese Application No. 2019-007221.
Office Action (Non-Final Rejection) dated Mar. 16, 2021 issued in related U.S. Appl. No. 16/742,574.

(Continued)

*Primary Examiner* — Marcellus J Augustin
(74) *Attorney, Agent, or Firm* — Holtz, Holtz & Volek PC

(57) ABSTRACT

An inspection apparatus includes: a hardware processor that: conducts an inspection on an image by comparing a scanned image with a correct image, the image being formed on paper in accordance with a print job, the scanned image being generated by reading the image, the correct image serving as a reference for the inspection of the image; and determines whether a page is a target for the inspection in accordance with a type of the paper on which the image will be formed according to print setting of the print job, wherein the hardware processor conducts the inspection on the image on a page that has been determined to be the target for the inspection by the hardware processor, and does not conduct the inspection on the image on a page that has been determined to not be the target for the inspection.

8 Claims, 5 Drawing Sheets

(56) References Cited

U.S. PATENT DOCUMENTS

| | | | |
|---|---|---|---|
| 9,060,084 | B2 | 6/2015 | Kaminaka |
| 2012/0070040 | A1 | 3/2012 | Vans et al. |
| 2013/0148863 | A1* | 6/2013 | Muraishi .................. G06T 7/33 |
| | | | 382/112 |
| 2014/0226177 | A1* | 8/2014 | Shijoh ..................... G06T 7/001 |
| | | | 358/1.14 |
| 2019/0061397 | A1* | 2/2019 | Yago ....................... B41J 29/46 |
| 2019/0362486 | A1 | 11/2019 | Diao et al. |
| 2020/0234421 | A1 | 7/2020 | Kaminaka |

FOREIGN PATENT DOCUMENTS

| | | | | |
|---|---|---|---|---|
| JP | 2007089095 | A | | 4/2007 |
| JP | 2007148027 | | * | 6/2007 ............. G03G 21/00 |
| JP | 2007148027 | A | | 6/2007 |
| JP | 2007241413 | A | | 9/2007 |
| JP | 2009025652 | A | | 2/2009 |
| JP | 2011118564 | A | | 6/2011 |
| JP | 2014185941 | A | | 10/2014 |
| JP | 2015118050 | A | | 6/2015 |
| JP | 2015230687 | A | | 12/2015 |
| JP | 2016061659 | A | | 4/2016 |
| JP | 2017056668 | A | | 3/2017 |

OTHER PUBLICATIONS

Related U.S. Appl. No. 16/742,574, First Named Inventor: Junpei Kaminaka; Title: "Reference Image Generating Apparatus, Image Forming System, Reference Image Generation Method, and Reference Image Generation Program"; Filed: Jan. 14, 2020.

Japanese Office Action (and English language translation thereof) dated Sep. 21, 2021 issued in Japanese Application No. 2019-007221 (which is a Japanese counterpart of related U.S. Appl. No. 16/742,574).

Notice of Allowance dated Sep. 2, 2021 issued in related U.S. Appl. No. 16/742,574.

Chinese Office Action (and English translation thereof) dated Sep. 27, 2021, issued in counterpart Chinese Application No. 202010034544.5.

Chinese Office Action (and English language translation thereof) dated Apr. 15, 2022, issued in counterpart Chinese Application No. 202010034544.5.

* cited by examiner

ACTUAL PRINTED MATTER

PRINTED MATTER ON PAGE THAT IS TARGET FOR INSPECTION

FIG. 5

INSPECTION APPARATUS, IMAGE FORMING SYSTEM, INSPECTION PROGRAM, AND INSPECTION METHOD

BACKGROUND

Technological Field

The present invention relates to an inspection apparatus, an image forming system, an inspection program, and an inspection method.

Description of the Related art

An image forming apparatus has an automatic inspection function of forming an image on paper and comparing a scanned image generated by reading the formed image with a correct image that is a normal image as a reference for inspection so as to detect a printed matter having an abnormality as waste paper. A printed matter that has been detected by using the automatic inspection function and that has an abnormality such as a stain, a streak, a firefly, or displacement is divided from a non-defective printed matter by using a purging function, and the printed matter is excluded.

As a prior art relating to the automatic inspection function, JP 2007-241413 A discloses the following technique. In the inspection of consistency among pages of a printed matter, it is inspected whether there is inconsistency between code information and page information. The code information is included in printed image data obtained by imaging a printed matter that has been generated on the basis of original image data. The page information is included in a control signal transmitted together with the original image data. Here, image data of a page that will not be inspected, such as a cover, has been registered in advance as non-inspection image data. Whether a page will not be inspected is determined on the basis of the non-inspection image data and information included in the control signal, and a page that has been determined to not be inspected is excluded from a target for inspection. By doing this, a printing operation can be prevented from uselessly stopping due to an inspection abnormality caused by regarding a page without code information, such as a cover, as a target for inspection, and unnecessary inspection processing performed on a page having less necessity for inspection, such as a cover, can be omitted.

However, in the prior art described above, a user needs to register non-inspection image data in advance. Therefore, in particular, in a case where there are many non-inspection images, there is a problem in which a relatively large burden is imposed on the user. In addition, there is a problem in which the prior art described above fails to cope with a case where, in product printing, a type of printing paper is changed to a type of paper that is not suitable for inspection and therefore a page to be excluded from inspection is changed.

SUMMARY

The present invention has been made in order to solve the problems described above. Stated another way, it is an object of the present invention to provide an inspection apparatus, an image forming system, an inspection program, and an inspection method that are capable of excluding, from a target for inspection, a printed matter of a type of paper that is not suitable for inspection using an automatic inspection function, without a burden, such as advanced registration, that is imposed on a user, and that are also capable of coping with a case where a type of paper is changed in product printing and therefore a page to be excluded from the target for inspection is changed.

To achieve the abovementioned object, according to an aspect of the present invention, an inspection apparatus reflecting one aspect of the present invention comprises: a hardware processor that: conducts an inspection on an image by comparing a scanned image with a correct image, the image being formed on paper in accordance with a print job, the scanned image being generated by reading the image, the correct image serving as a reference for the inspection of the image; and determines whether a page is a target for the inspection in accordance with a type of the paper on which the image will be formed according to print setting of the print job, wherein the hardware processor conducts the inspection on the image on a page that has been determined to be the target for the inspection by the hardware processor, and does not conduct the inspection on the image on a page that has been determined to not be the target for the inspection.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating a job editing operation screen; and

DETAILED DESCRIPTION OF EMBODIMENTS

Figure 1:
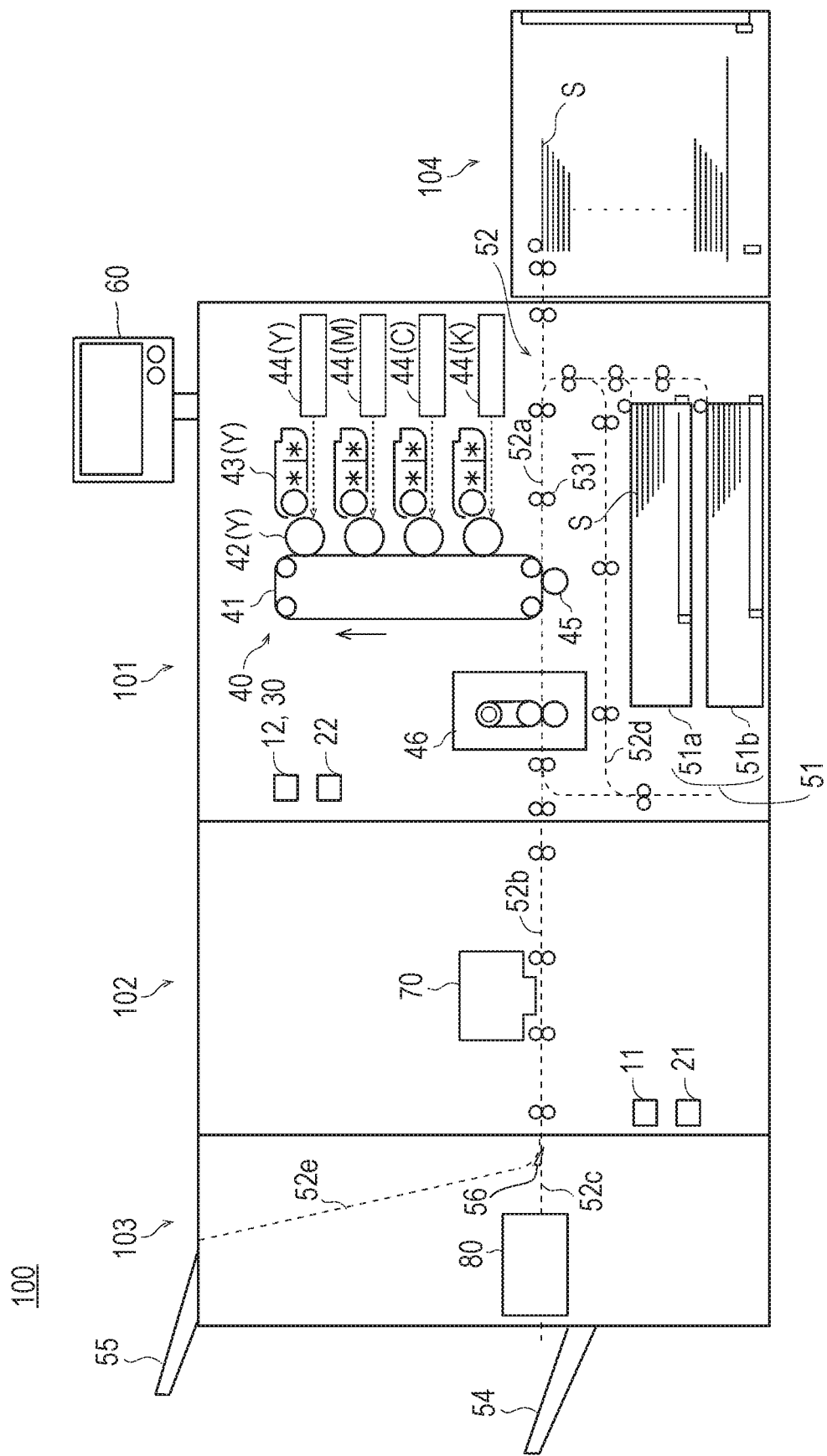
FIG. 1 is a schematic diagram illustrating a configuration of an image forming system.

Hereinafter, one or more embodiments of the present invention will be described with reference to the drawings. However, the scope of the invention is not limited to the disclosed embodiments. Note that, in the description of the drawings, the same elements are denoted by the same reference marks, and duplicate description is omitted. In addition, a dimension ratio in the drawings is exaggerated for convenience of description, and the dimension ratio may be different from an actual ratio.

Figure 2:
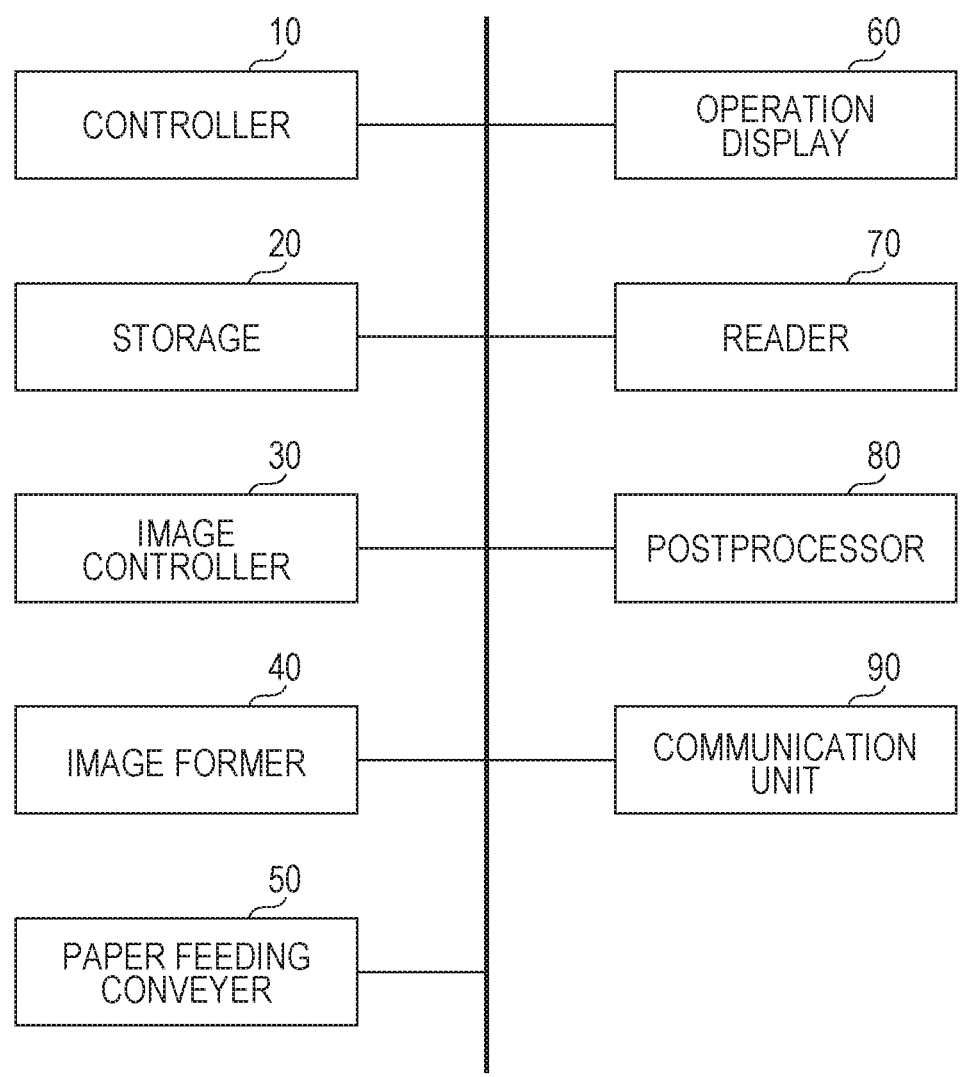
FIG. 2 is a block diagram illustrating the configuration of the image forming system.

FIG. 1 is a schematic diagram illustrating a configuration of an image forming system according to an embodiment of the present invention. FIG. 2 is a block diagram illustrating the configuration of the image forming system.

An image forming system 100 includes an image forming device 101, a reading device 102, a postprocessing device 103, and a paper feeding device 104. The image forming device 101 forms (prints) an image on paper S. The reading device 102 reads the image formed on the paper S. The postprocessing device 103 performs postprocessing on the paper on which the image has been formed. The paper feeding device 104 together with a paper feeding tray 51 feeds stored paper S to an image former 40. Each of these devices may mutually include another device. Accordingly, for example, the image forming device 101 can include the reading device 102. The image forming system 100 can be a production printer. The reading device 102 configures an inspection apparatus.

As illustrated in FIG. 2, the image forming system 100 includes a controller 10, a storage 20, an image controller 30, an image former 40, a paper feeding conveyer 50, an operation display 60, a reader 70, a postprocessor 80, and a communication unit 90. These are mutually connected via a bus through which a signal is communicated among respective units.

The controller 10 is a CPU, and controls the respective units or performs various types of arithmetic processing according to a program. The controller 10 includes a controller 12 included in the image forming device 101, and a controller 11 included in the reading device 102. The controller 10 controls the entirety of the image forming system 100 in cooperation between the controller 12 and the controller 11. Details of an operation of the controller 10 will be described later. The controller 11 configures an inspection unit and a determination unit. The controller 11 together with the image controller 30 configures a correct image generator.

The storage 20 includes a storage 22 included in the image forming device 101, and a storage 21 included in the reading device 102. The storage 20 is configured by a ROM that stores various programs or various types of data, a RAM that transitorily stores a program or data as a working area, a hard disk that stores various programs or various types of data, and the like.

The image controller 30 performs layout processing and rasterization processing on print data included in a print job, and generates image data serving as data of an image of a bitmap format. The print job is a generic term of a print command issued to the image forming device 101 or the like, and includes print data and print setting. The print data is data of a document that is a target for printing, and the print data can include various types of data such as image data, vector data, or text data. Specifically, the print data can be page description language (PDL) data, portable document format (PDF) data, or tagged image file format (TIFF) data. The print setting is setting relating to image formation and postprocessing performed on paper. The print setting include setting of, for example, a type of paper, selection of color or monochrome, selection of simplex printing or duplex printing, N in 1 (page assignment), the number of printing copies, stapling, punching, folding, a watermark, an orientation of an original, and the size of paper. Print setting such as the type of paper or punching can be performed for each page.

The image former 40 includes an intermediate transfer belt 41, a photoreceptor drum 42, a developing unit 43, a writer 44, and a secondary transfer unit 45.

The image former 40 forms an image on paper S on the basis of a print job, as described below.

Each of the photoreceptor drum 42, the developing unit 43, and the writer 44 includes configurations that correspond to respective basic colors, yellow (Y), magenta (M), cyan (C), and black (K). In FIG. 1, reference marks other than the reference marks 42(Y) and 43(Y) that denote respective photoreceptor drums 42 and respective developing units 43 are omitted.

The writer 44 of the image former 40 exposes a surface of the photoreceptor drum 42 that has been electrified on the basis of image data, and forms an electrostatic latent image. The developing unit 43 develops the formed electrostatic latent image with toner of the developing unit 43, and forms a toner image of each color on a surface of each of the photoreceptor drums 42. This toner image is sequentially superimposed on the intermediate transfer belt 41 by a primary transfer unit (not illustrated) of each of the colors, and a full-color toner image is formed. This toner image is transferred on paper S by the secondary transfer unit 45. Then, the paper S on which the toner image has been formed is conveyed to a fixing unit 46, and the fixing unit 46 performs heating and pressurization, so that a full-color image is fixed on the paper S.

The paper feeding conveyer 50 includes a paper feeding tray 51, a conveyance path 52 (52a to 52e), a plurality of conveyance rollers, a driving motor (not illustrated) that drives these conveyance rollers, and the paper feeding device 104.

The paper feeding conveyer 50 is driven by the driving motor to rotate each of the conveyance rollers at a predetermined timing, and conveys, to the image former 40, paper S that has been fed from the paper feeding tray 51 or the paper feeding device 104.

Here, the paper feeding tray 51 is a two-drawer tray including an upper tray 51a and a lower tray 51b. The upper tray 51a and the lower tray 51b individually store paper, and feed the paper to the image forming device 101.

The paper feeding device 104 stores more sheets of paper than the upper tray 51a and the lower tray 51b inside the image forming device 101, and feeds paper S to the image forming device 101.

The conveyance path 52 is configured by conveyance paths 52a and 52d inside the image former 40, a conveyance path 52b inside the reading device 102, and conveyance paths 52c and 52e inside the postprocessor 80.

Paper S fed from the paper feeding device 104 or the paper feeding tray 51 is conveyed through the conveyance path 52a. On the conveyance path 52a, a resist roller 531 is disposed that rotates or stops by using a clutch so as to adjust a conveyance timing of paper.

Paper S that has been conveyed through the conveyance path 52a and on which an image has been formed by the image former 40 passes through the conveyance paths 52b and 52c on a downstream side, various types of processing according to print setting of a print job are performed on the paper S, and the paper S is ejected outside and is placed on an ejected paper tray 54.

Inspection using an automatic inspection function (hereinafter also simply referred to as "inspection") is performed by the reading device 102 on paper S on which an image has been formed by the image former 40 on the basis of a print job of regular printing for outputting a printed matter as a product. The image that has been formed on the paper S on the basis of the print job of regular printing (hereinafter also referred to as an "inspection image") is a target for inspection. Hereinafter, the print job of regular printing is also referred to as an inspection job. The automatic inspection function is a function of detecting an abnormality in a printed matter by comparing a correct image as a reference for inspection conducted on an inspection image that has been formed on the basis of an inspection job with a scanned image that has been generated by reading the inspection image by the reader 70. Paper S in which an abnormality has been detected is determined to be waste paper, and is excluded from a printed matter as a product.

The correct image can be generated by the reader 70 reading an image that has been output in a proof output mode or a sample output mode before the execution of an inspection job and has been formed on paper S. The correct image may be generated by the image controller 30 performing rasterization on the same print data as print data included in an inspection job. The proof output mode can be a mode in which, one copy of a printed matter is generated before the execution of an inspection job, a scanned image of the printed matter is stored as a correct image in a case where the printed matter has been determined to be normal in visual inspection, inspection is conducted on the printed matter in association with the inspection job, and the inspection job is deleted from the storage 20 (or the inspection job is not stored in the storage 20). The sample output mode can be a mode in which one printed matter is generated for any of stored inspection job, a scanned image of the printed matter is associated as a correct image with the inspection job, and the scanned image is stored together with the inspection job. Hereinafter, a print job for generating a correct image is referred to as a "correct image generation job".

Paper S that has been determined to be waste paper as a result of inspecting an inspection image passes through the conveyance path 52e, and is ejected onto a sub tray 55. By doing this, paper S that has been determined to be waste paper is excluded from a printed matter. Not only paper S (a printed matter) that has been determined to be waste paper is ejected onto the sub tray 55, but all sheets of paper S that are included in a copy including the waste paper can be ejected onto the sub tray 55. Whether paper S on which an image has been formed will be ejected onto the sub tray 55 via the conveyance path 52e or will be ejected onto the ejected paper tray 54 via the conveyance path 52c is selected by the controller 10 controlling a guide plate 56.

If duplex printing has been set in print setting of a print job, paper S in which an image has been formed on one surface (a first surface; normally, a front surface) is conveyed to an ADU conveyance path 52d that is located below the image former 40. The paper S that has been conveyed to this ADU conveyance path 52d is reversed through a switchback path, and joins the conveyance path 52a. An image is also formed on the other surface (a second surface; normally, a reverse surface) of the paper S by the image former 40.

The operation display 60 includes a display with a touch panel, numeric keys, a start button, a stop button, and the like. The operation display 60 displays an input screen used to input various instructions, a state of a device, and the like, and receives an input of various types of setting such as print setting and various instructions.

The reader 70 is provided on the conveyance path 52b. The reader 70 reads an image on paper S on which image formation has been performed and that is passing through this conveyance path 52b so as to generate a scanned image. The scanned image can be, for example, data of a bitmap format.

The reader 70 includes a line image sensor, a lens optical system, a light emitting diode (LED) light source, a housing that houses these, and the like. The reader 70 reads an image that has been formed on conveyed paper S. Light from the LED light source is applied to a surface of paper S that is passing through a reading position on the conveyance path 52b, an image in the reading position is introduced by the lens optical system, and the image is formed on the line image sensor, so that the image is read.

The reader 70 reads an inspection image on paper S by using the automatic inspection function so as to generate a scanned image. The reader 70 also reads a printed matter that has been generated in the sample output mode or the like before the execution of an inspection job so as to generate a correct image.

The postprocessor 80 is provided on the conveyance path 52c. The postprocessor 80 perform, for example, binding processing. The postprocessor 80 includes a stacker that stacks sheets of paper S, and a stapler. The postprocessor 80 causes this stacker to stack plural sheets of paper S, and causes the stapler to perform side stitching using a staple. A bundle of paper S on which side stitching has been performed is ejected onto the ejected paper tray 54. Paper S on which side stitching has not been performed is ejected onto the ejected paper tray 54 via the conveyance path 52c with no change.

The postprocessor 80 ejects, onto the sub tray 55 via the conveyance path 52e, a printed matter on which an inspection image for a page that has been determined to be waste paper in inspection has been formed.

As the communication unit 90, various local connection interfaces, for example, a network interface according to a standard such as SATA, PCI Express, USB, Ethernet (registered trademark), or IEEE 1394, or a wireless communication interface such as Bluetooth (registered trademark) or IEEE 802.11, are used. Print data and a print job configured by print setting can be received from an external terminal such as a PC via the communication unit 90.

Details of an operation of the controller 10 are described.

The controller 10 causes the image former 40 to form an inspection image on paper S on the basis of an inspection job, and causes the reader 70 to read the inspection image formed on the paper S so as to generate a scanned image. The controller 10 compares the generated scanned image with a correct image that has been associated with (has been linked to) the inspection job so as to inspect the inspection image formed on the paper S. In a case where the controller 10 determines that the inspection image formed on the paper S has an abnormality, as a result of inspection, the controller 10 determines that the paper S on which the inspection image that has been determined to have an abnormality has been formed is waste paper, and the controller 10 ejects the paper S onto the sub tray 55. Examples of an abnormality in an inspection image on paper S that is determined to be waste paper include a stain, a streak, a firefly, displacement, a folded corner, wrinkles, inclination, and the like. Paper S that has been determined to be non-defective in inspection is ejected as a printed matter of a product onto the ejected paper tray 54.

The controller 10 determines whether a page is a target for inspection on the basis of the type of paper S on which an inspection image will be formed according to print setting of an inspection job. The controller 10 can determine at least one of a page on which an inspection image will be formed on embossed paper as a result of executing an inspection job and a page on which an inspection image will be formed on paper S including punched holes to be a page that is not a target for inspection.

Figure 3:
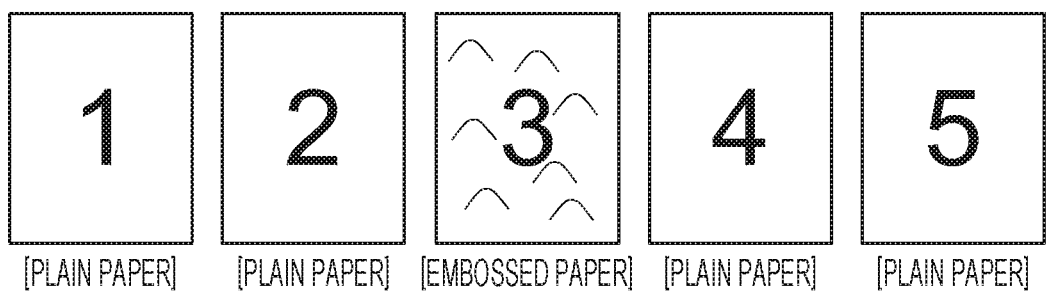
FIG. 3 is a diagram illustrating a printed matter on which an inspection image has been formed on the basis of an inspection job.
Figure 4:
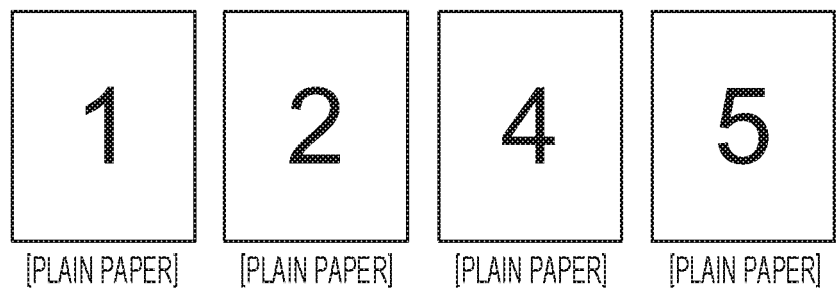
FIG. 4 is a diagram illustrating a printed matter on a page that is a target for inspection in the printed matter illustrated in FIG. 3 on which the inspection image has been formed.

FIG. 3 is a diagram illustrating a printed matter on which an inspection image has been formed on the basis of an inspection job. FIG. 4 is a diagram illustrating a printed matter on a page that is a target for inspection in the printed matter illustrated in FIG. 3 on which the inspection image has been formed. A numerical character illustrated in FIGS. 3 and 4 indicates a number of a page. In the examples of FIGS. 3 and 4, the number of pages of an inspection image that has been formed on the basis of an inspection job is 5. In addition, print setting of the inspection job has been performed in such a way that only an inspection image on a third page will be formed on embossed paper and inspection images on the other pages will be formed on plain paper.

In the example of FIG. 3, an inspection image has been formed on all of the pages of a printed matter according to an inspection job.

As illustrated in FIG. 4, a printed matter on which an inspection image has been formed on embossed paper has been excluded from a printed matter serving as a target for inspection. This is because a page on which the inspection image will be formed on embossed paper has been determined to be a page that is not a target for inspection.

A page on which an inspection image will be formed on embossed paper is determined to be a page that is not a target for inspection, for the following reason. In some cases, even sheets of embossed paper that have the same uneven pattern have a slightly different unevenness according to precision at the time of manufacturing the sheets of embossed paper. Accordingly, there is a possibility that, due to this, a difference between a scanned image of embossed paper on which an inspection image has been formed and a correct image will be determined to be larger than a reference so that a printed matter to be determined to be non-defective will be detected as waste paper.

A page on which an inspection image will be formed on paper S including punched holes is determined to be a page that is not a target for inspection, for the following reason. The positions of the punched holes are not fixed with respect to the paper S in some cases, and therefore it can be sensed that there is an abnormality of displacement. In addition, in some cases, even when the positions of the punched holes are fixed with respect to the paper S, the positions of the punched holes are not fixed with respect to the position of the inspection image. In these cases, in comparison at the time of image positioning, either the punched holes or the inspection image has been displaced, and therefore there is a possibility that a printed matter to be determined to be non-defective will be detected as waste paper. Further, in some cases, a residue of paper (such as burrs) that has been generated at the time of manufacturing the paper S including the punched holes remains in the paper S. Due to this, in a comparison between a scanned image of the inspection image and a correct image, a difference exceeds a reference, and therefore there is a possibility that the erroneous detection of waste paper will occur.

The controller 10 causes the image former 40 to form an image on paper S on the basis of a correct image generation job, and causes the reader 70 to read the paper S on which the image has been formed so as to generate a scanned image to be used as a correct image. The generated scanned image is determined to be normal in visual inspection or the like conducted by a user. Then, the generated scanned image is associated as a correct image with an inspection job in which the correct image will be used in inspection, and is stored in the storage 20.

The controller 10 can form the same images as images on all of the pages that will be formed by executing the inspection job on respective sheets of paper S of plain paper, and can cause the reader 70 to read the formed images on all of the pages so as to generate correct images, and the controller 10 can store the correct images in the storage 20.

The controller 10 may store, in the storage 20, correct images that correspond to pages that have been determined to be a target for inspection from among the generated correct images, and may not store, in the storage 20, correct images that correspond to pages that have been determined to not be a target for inspection. By doing this, an inspection can be conducted on images that have been formed on pages that correspond to the correct images stored in the storage 20, and an inspection can be omitted on images that have been formed on pages that correspond to the correct images that are not stored in the storage 20. Stated another way, in the examples of FIGS. 3 and 4, correct images that correspond to pages on which an image will be formed on plain paper can be caused to be stored in the storage 20, and correct images that correspond to pages on which an image will be formed on embossed paper can be caused to not be stored in the storage 20. By doing this, the correct images that correspond to the pages on which an image will be formed on embossed paper have not been stored in the storage 20. Therefore, correct images required in inspection do not exist for formed images on pages on which an image has been formed on embossed paper, and a state can be generated where the formed images will fail to be inspected.

In addition, in a case where correct images that correspond to pages that have been determined to not be a target for inspection are caused to be stored in the storage 20, in the execution of a correct image generation job, the controller 10 may not cause the reader 70 to read the pages that are not a target for inspection, or the controller 10 may also generate correct images for the pages that are not a target for inspection without storing the correct images in the storage 20. As described above, a page on which an image will be formed on embossed paper according to an inspection job can be determined to not be a target for inspection. In this case, the controller 10 may not use plain paper for all of the sheets of paper S on which an image will be formed in a correct image generation job, but may similarly use embossed paper for pages on which an image will be formed on embossed paper in an inspection job.

Figure 5:
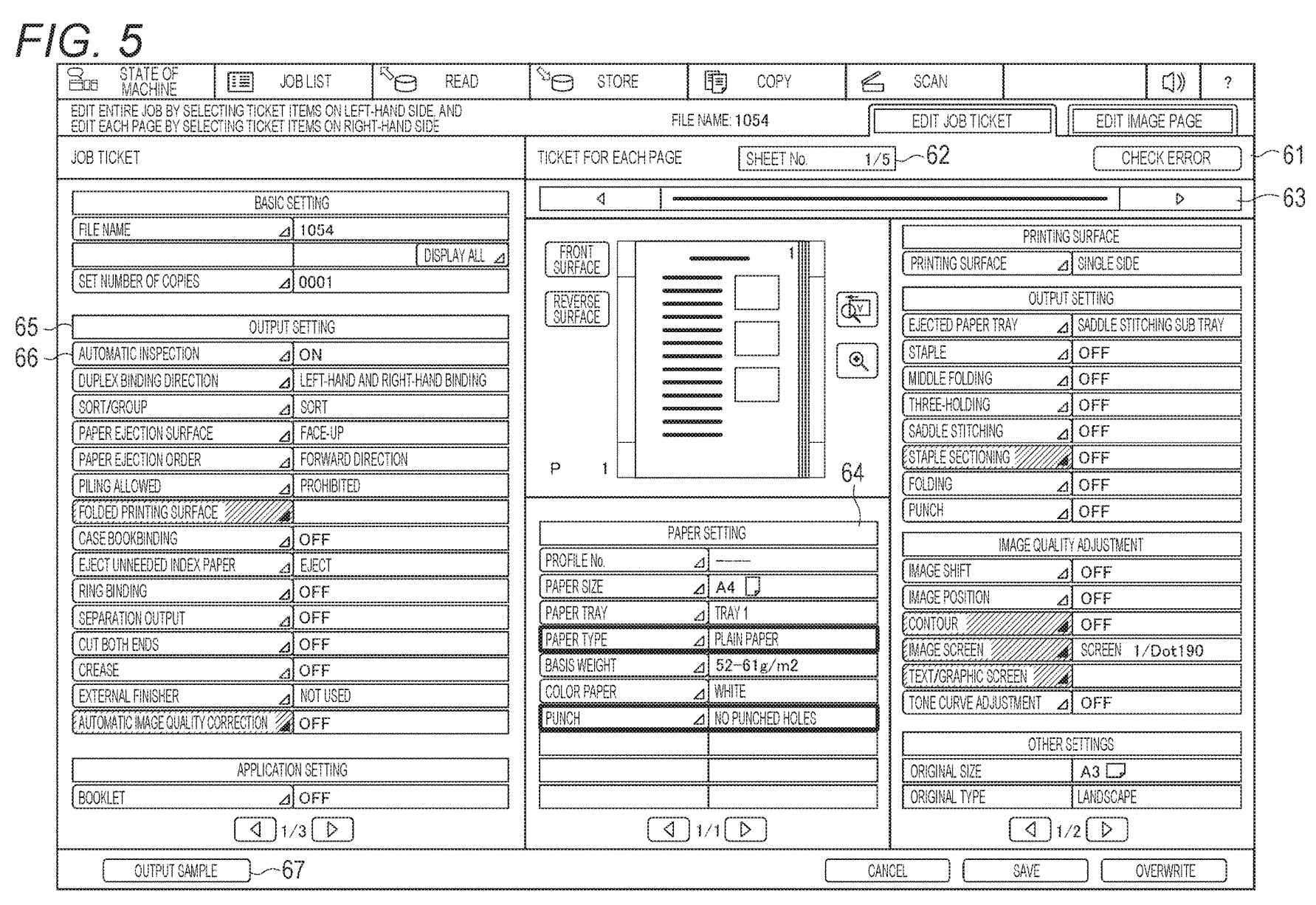

FIG. 5 is a diagram illustrating a job editing operation screen. The job editing operation screen is an operation screen on which an instruction to generate and execute a correct image generation job is issued and an instruction to generate and execute an inspection job is issued. The job editing operation screen can be displayed on the operation display 60. The operation screen may be displayed on a screen of a terminal (not illustrated) that is communicable to the image forming system 100.

An instruction to generate and execute a correct image generation job can be issued as described below. A file (print data) to be used to generate a correct image is selected using a file name by operating the button "file name". In FIG. 5, "1054" has been selected as the file name. The total number of pages of the selected file is "5", as indicated in a sheet number display field 62 of the field "ticket for each page" 61 that is used to perform print setting for each page. A page on which print setting is to be performed can be selected by operating a page feeding button 63. In FIG. 5, a first page has been selected. Print setting has been performed on paper S on the first page in such a way that the type of paper is plain paper and no punched holes are generated, as surrounded with a bold line in the field "paper setting" 64.

When the button "automatic inspection" 66 in the field "output setting" 65 is operated so that the setting of "automatic inspection" is turned on and the button "sample output" is selected, a correct image print job for generating a correct image in the sample output mode is generated. The generated correct image print job is executed by the image forming device 101 and the reading device 102, and a correct image is generated.

An instruction to generate and execute an inspection job can be issued as described below. As a file (print data) for which an image will be formed according to an inspection job, the same file as a file used to generate a correct image is selected using a file name by operating the button "file name". In the field "paper setting" 64 and the like, print setting is performed on each page. For example, when embossed paper is selected as the type of paper in the field "paper setting" 64 in print setting performed on a third page, an image for the third page is formed on paper S of embossed paper. In this case, as described above, on the third page, an image is formed on paper S of embossed paper. Therefore, a printed matter on which an image for the third page has been formed can be determined to not be a target for inspection.

When the button "automatic inspection" 66 in the field "output setting" 65 is operated so that the setting of "automatic inspection" is turned on, an automatic inspection setting screen (not illustrated) is displayed. On the automatic inspection setting screen, a file name of a correct image to be used in inspection is input or selected, and the button "OK" is selected, so that an inspection job is generated. At this time, print setting included in the inspection job is transmitted to the reading device 102, so that it is determined whether a page is a target for inspection. The image forming device 101 forms an image on paper S on the basis of the generated inspection job, and the reading device 102 conducts an inspection on a printed matter (the paper S) on which an inspection image for a page that has been determined to be a target for inspection has been formed.

An operation of the image forming system is described.

Figure 6:
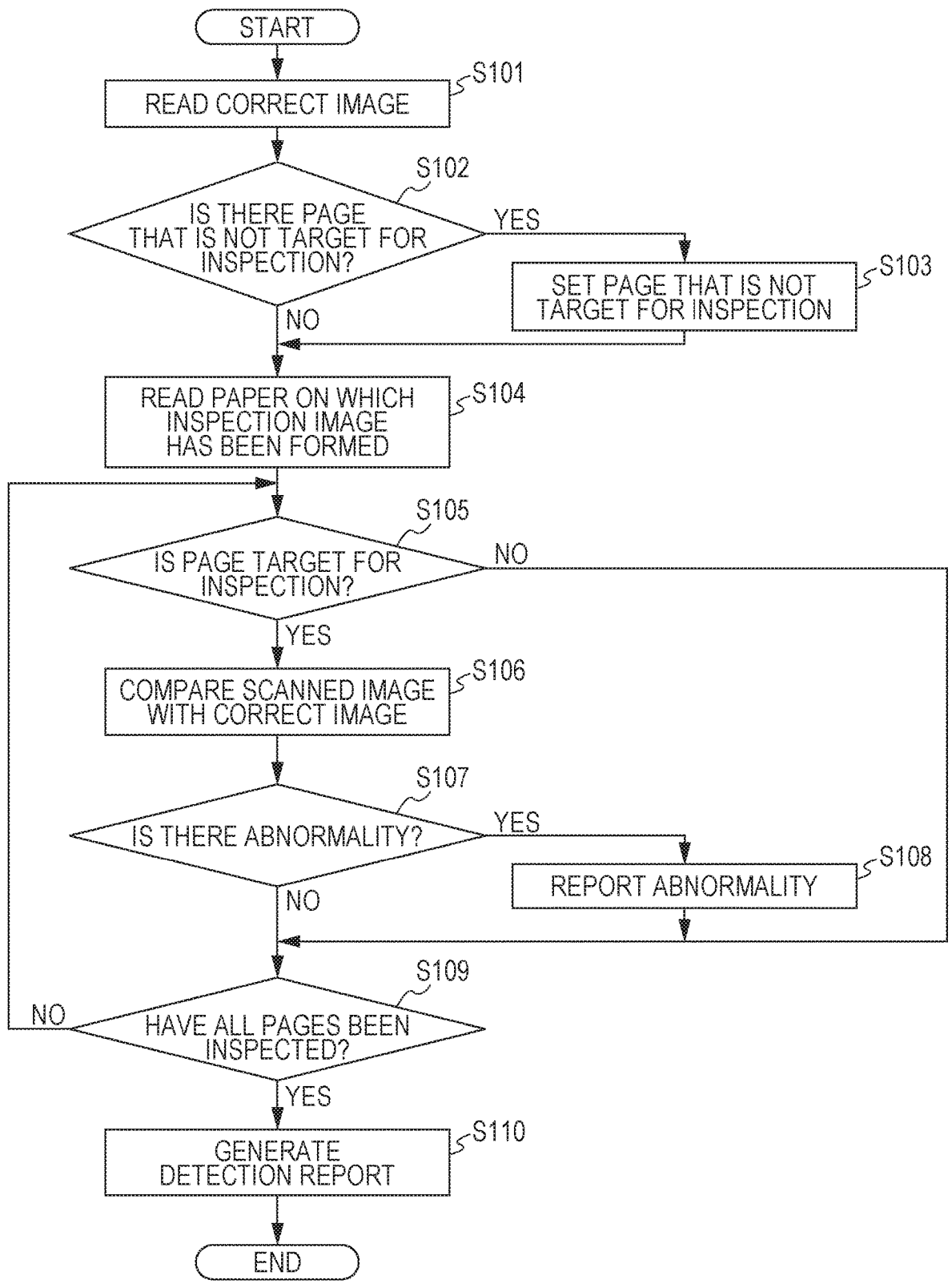
FIG. 6 is a flowchart illustrating an operation of the image forming system.

FIG. 6 is a flowchart illustrating the operation of the image forming system. This flowchart can be performed according to a program that has been stored in the storage 21, by the controller 11 included in the reading device 102. Part of this flowchart may be performed in cooperation between the controller 11 and the controller 12 included in the image forming device 101.

The controller 11 reads, from the storage 20, a correct image to be used to inspect an inspection image that has been formed on paper S on the basis of an inspection job (S101).

The controller 11 determines whether there is a page to be determined to not be a target for inspection (S102). Specifically, the controller 11 determines whether a page is a target for inspection on the basis of the type of paper S on which an inspection image for each page will be formed according to print setting of the inspection job.

In a case where there is a page to be determined to not be a target for inspection (S102: YES), the controller 11 sets the page to be a page that is not a target for inspection (S103). Specifically, image data of a page that has been determined to be a page to be determined to not be a target for inspection is stored in the storage 20 in association with an internal parameter indicating that the page is not a target for inspection, so that the page can be set to be a page that is not a target for inspection.

The controller 11 causes the reader 70 to read paper S on which an inspection image has been formed by the image former 40 so as to generate a scanned image (S104).

The controller 11 determines, for each inspection image on each page, whether the scanned image is a scanned image obtained by reading an inspection image on a page that is a target for inspection or a scanned image obtained by reading an inspection image on a page that is not a target for inspection (S105). The determination above is performed by determining the presence/absence of the internal parameter described above for each image data that corresponds to an inspection image on each of the pages.

In a case where the controller 11 determines that a page is not a target for inspection (S105: NO), the controller 11 does not conduct the inspection of steps S106 to S108 on the page, and conducts the processing of step S109 and the steps that follow.

In a case where the controller 11 determines that a page is a target for inspection (S105: YES), the controller 11 compares a scanned image of paper S on which an inspection image for the page has been formed with a correct image that corresponds to the page (S106).

The controller 11 compares the scanned image with the correct image, and determines whether the inspection image has an abnormality on the basis of whether a difference exceeds a reference (S107).

In a case where the controller 11 determines that the inspection image does not have an abnormality (S107: NO), the processing moves on to step S109.

In a case where the controller 11 determines that the inspection image has an abnormality (S107: YES), the controller 11 transmits, to the controller 12 of the image forming device 101, an abnormality report specifying a job ID of the inspection job (S108). The controller 12 of the image forming device 101 performs, on the postprocessing device 103, purging control to eject, onto the sub tray 55, all of the printed matters that are included in a copy including a printed matter (paper S) on which the inspection image having an abnormality has been formed.

In a case where the controller 11 determines that an inspection has not yet been conducted on all of the pages according to the inspection job (S109: NO), the processing returns to step S105, and the processing is continued.

In a case where the controller 11 determines that an inspection has already been conducted on all of the pages according to the inspection job (S109: YES), the controller 11 generates a detection report (S110). The detection report can be stored in the storage 20 so as to be accessible from an external terminal of the image forming system 100, and the like via a network by using the communication unit 90. The detection report can include basic information such as a job ID of an inspection job or print setting, and a scanned image of an inspection image that has been specified in a visually recognizable manner, for example, by surrounding an abnormality occurrence region with a line.

The present embodiment exhibits the effects described below.

A page to be determined to not be a target for inspection is determined on the basis of the type of paper on which an image will be formed according to print setting of a print job, and an image on a page that has been determined to not be the target for inspection is excluded from the target for inspection. By doing this, a printed matter of a type of paper that is not suitable for inspection using an automatic inspection function can be excluded from the target for inspection, without a burden, such as advanced registration, that is imposed on a user. In addition, a case can be coped with where a type of paper is changed in product printing and therefore a page to be excluded from the target for inspection is changed.

Further, at least one of a page on which an image will be formed on embossed paper and a page on which an image will be formed on paper including punched holes is determined to be a page that is not the target for inspection. By doing this, a page that is not the target for inspection can be set appropriately.

Furthermore, correct images are generated that correspond to images on respective pages that will be formed according to a print job. From among the correct images, correct images that correspond to images on pages that have been determined to be the target for inspection are stored in a storage, and correct images that correspond to images on pages that have been determined to not be the target for inspection are not stored in the storage. By doing this, the use of a large storage capacity of the storage can be avoided, and processing speed can be increased.

The configurations of the inspection apparatus, the image forming system, the inspection program, and the inspection method that have been described above are provided to describe principal configurations in the description of features of the embodiment described above. The configurations described above are not restrictive, and various modifications can be made without departing from the scope of the claims. In addition, the configurations described above are not intended to exclude a configuration that a general image forming system or the like has.

Further, units and a method for performing various types of processing in the inspection apparatus or the image forming system according to the embodiment described above can be implemented by any of a dedicated hardware circuit and a programmed computer. The program described above may be provided, for example, by a computer readable recording medium such as a USB memory or a digital versatile disc (DVD)-ROM, or may be provided on line via a network such as the Internet. In this case, normally, a program that has been recorded in the computer readable recording medium is transferred to a storage such as a hard disk, and is stored in the storage. In addition, the program described above may be provided as independent application software, or may be incorporated as a single function into software of a device, such as a detector, of the independent application software.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inspection apparatus, comprising:
a hardware processor configured to:
conduct an inspection on an image by comparing a scanned image with a correct image, the image being formed on paper in accordance with a print job, the scanned image being generated by reading the image, and the correct image serving as a reference for the inspection of the image; and
determine whether a page is a target for the inspection in accordance with a type of the paper on which the image will be formed according to a print setting of the print job,
wherein:
the hardware processor conducts the inspection on the image formed on a page that has been determined to be the target for the inspection, and does not conduct the inspection on the image formed on a page that has been determined to not be the target for the inspection, and
the hardware processor determines, as a page that is not the target for the inspection, at least one of (i) a page on which the image will be formed on embossed paper as the type of the paper, and (ii) a page on which the image will be formed on paper including punched holes as the type of the paper.

2. The inspection apparatus according to claim 1, wherein:
the hardware processor generates the correct image that corresponds to the image formed on a page, for each of a plurality of pages, the image being formed in accordance with the print job,
the hardware processor stores, in a storage, a correct image that corresponds to an image formed on a page that has been determined to be the target for the inspection, from among a plurality of the correct images generated by the hardware processor, and does not store, in the storage, a correct image that corresponds to an image formed on a page that has been determined to not be the target for the inspection, and
the hardware processor conducts the inspection on the image formed on a page that corresponds to a correct image that has been stored in the storage, and does not conduct the inspection on the image formed on a page that corresponds to a correct image that has not been stored in the storage.

3. An image forming system, comprising:
a hardware processor configured to:
conduct an inspection on an image by comparing a scanned image with a correct image, the image being formed on paper in accordance with a print job, the scanned image being generated by reading the image, and the correct image serving as a reference for the inspection of the image; and
determine whether a page is a target for the inspection in accordance with a type of the paper on which the image will be formed according to print setting of the print job; and
an image former that forms the image on the paper in accordance with the print job, wherein:
the hardware processor conducts the inspection on the image formed on a page that has been determined to be the target for the inspection, and does not conduct the inspection on the image formed on a page that has been determined to not be the target for the inspection, and
the hardware processor determines, as a page that is not the target for the inspection, at least one of (i) a page on which the image will be formed on embossed paper as the type of the paper, and (ii) a page on which the image will be formed on paper including punched holes as the type of the paper.

4. The image forming system according to claim 3, wherein:
the hardware processor generates the correct image that corresponds to the image formed on a page, for each of a plurality of pages, the image being formed in accordance with the print job,
the hardware processor stores, in a storage, a correct image that corresponds to an image formed on a page that has been determined to be the target for the inspection, from among a plurality of the correct images generated by the hardware processor, and does not store, in the storage, a correct image that corresponds to an image formed on a page that has been determined to not be the target for the inspection, and
the hardware processor conducts the inspection on the image formed on a page that corresponds to a correct image that has been stored in the storage, and does not conduct the inspection on the image formed on a page that corresponds to a correct image that has not been stored in the storage.

5. A non-transitory recording medium storing a computer readable inspection program executed by an inspection apparatus that conducts an inspection on an image by comparing a scanned image with a correct image, the image being formed on paper in accordance with a print job, the scanned image being generated by reading the image, the correct image serving as a reference for the inspection of the image, and the inspection program causing a computer to perform processes comprising:
- determining whether a page is a target for the inspection in accordance with a type of the paper on which the image will be formed according to a print setting of the print job; and
- conducting the inspection on the image formed on a page that has been determined in the determining to be the target for the inspection, and not conducting the inspection on the image formed on a page that has been determined in the determining to not be the target for the inspection,
- wherein the determining determines, as a page that is not the target for the inspection, at least one of (i) a page on which the image will be formed on embossed paper as the type of the paper, and (ii) a page on which the image will be formed on paper including punched holes as the type of the paper.

6. The non-transitory recording medium according to claim 5, the processes further comprising:
- generating the correct image that corresponds to the image formed on a page, for each of a plurality of pages, the image being formed in accordance with the print job; and
- storing, in a storage, a correct image that corresponds to an image formed on a page that has been determined to be the target for the inspection, from among a plurality of the correct images generated in the generating, and not storing, in the storage, a correct image that corresponds to an image formed on a page that has been determined to not be the target for the inspection,
- wherein the inspection is conducted on the image formed on a page that corresponds to a correct image that has been stored in the storage, and the inspection is not conducted on the image formed on a page that corresponds to a correct image that has not been stored in the storage.

7. An inspection method performed by an inspection apparatus that conducts an inspection on an image by comparing a scanned image with a correct image, the image being formed on paper in accordance with a print job, the scanned image being generated by reading the image, the correct image serving as a reference for the inspection of the image, and the inspection method comprising:
- determining whether a page is a target for the inspection in accordance with a type of the paper on which the image will be formed according to a print setting of the print job; and
- conducting the inspection on the image formed on a page that has been determined in the determining to be the target for the inspection, and not conducting the inspection on the image formed on a page that has been determined in the determining to not be the target for the inspection,
- wherein the determining determines, as a page that is not the target for the inspection, at least one of (i) a page on which the image will be formed on embossed paper as the type of the paper, and (ii) a page on which the image will be formed on paper including punched holes as the type of the paper.

8. The inspection method according to claim 7, the inspection apparatus including a hardware processor, and the inspection method further comprising:
- generating, by the hardware processor, the correct image that corresponds to the image formed on a page, for each of a plurality of pages, the image being formed in accordance with the print job; and
- storing, in a storage, a correct image that corresponds to an image formed on a page that has been determined to be the target for the inspection, from among a plurality of the correct images generated in the generating, and not storing, in the storage, a correct image that corresponds to an image formed on a page that has been determined to not be the target for the inspection,
- wherein the inspection is conducted on the image formed on a page that corresponds to a correct image that has been stored in the storage, and the inspection is not conducted on the image formed on a page that corresponds to a correct image that has not been stored in the storage.

* * * * *